(12) United States Patent
Gibbs et al.

(10) Patent No.: US 10,070,072 B2
(45) Date of Patent: Sep. 4, 2018

(54) SYSTEM AND METHOD FOR DETECTING HIGH-ENERGY PHOTONS

(71) Applicant: Savannah River Nuclear Solutions, LLC, Aiken, SC (US)

(72) Inventors: Kenneth M. Gibbs, Clarks Hill, SC (US); Monica H. Phillips, Aiken, SC (US)

(73) Assignee: Savannah River Nuclear Solutions, LLC, Aiken, SC (US)

( * ) Notice: Subject to any disclaimer, the term of this patent is extended or adjusted under 35 U.S.C. 154(b) by 382 days.

(21) Appl. No.: 14/876,873

(22) Filed: Oct. 7, 2015

(65) Prior Publication Data

US 2016/0182836 A1    Jun. 23, 2016

Related U.S. Application Data

(60) Provisional application No. 62/093,810, filed on Dec. 18, 2014.

(51) Int. Cl.
*G01T 7/00* (2006.01)
*G01T 3/06* (2006.01)
*H04N 5/32* (2006.01)

(52) U.S. Cl.
CPC ...... *H04N 5/32* (2013.01); *G01T 7/00* (2013.01)

(58) Field of Classification Search
CPC .... G01T 1/00; G01T 1/17; G01T 1/24; H04N 5/32; H04N 5/33; H04N 5/357; H04N 7/18
See application file for complete search history.

(56) References Cited

U.S. PATENT DOCUMENTS

| 7,391,028 | B1 | 6/2008 | Rubenstein |
| 7,737,410 | B2 | 6/2010 | Rubenstein |
| 8,583,937 | B2 | 11/2013 | Adams et al. |
| 2006/0169905 | A1* | 8/2006 | Wenstrand ............ G01T 1/2928 250/370.1 |
| 2013/0038766 | A1* | 2/2013 | Perlman ................. H04N 5/357 348/294 |

* cited by examiner

*Primary Examiner* — Sathyanaraya V Perungavoor
*Assistant Examiner* — Patricia I Young
(74) *Attorney, Agent, or Firm* — Dority & Manning, P.A.

(57) ABSTRACT

A system for detecting high-energy photons includes a pixelated image detector exposed to visible light and high-energy photons, and the pixelated image detector generates one or more images from the exposure to the visible light and high-energy photons. The system further includes one or more processors operably connected to the pixelated image detector and configured to perform operations on the one or more images to discriminate between visible light and high-energy photons. A method for detecting high-energy photons includes exposing a pixelated image detector to visible light and high-energy photons and discriminating between the visible light that interacts with the pixelated image detector and the high-energy photons that interact with the pixelated image detector.

6 Claims, 5 Drawing Sheets

SYSTEM AND METHOD FOR DETECTING HIGH-ENERGY PHOTONS

CROSS REFERENCE TO RELATED APPLICATION

This application claims filing benefit of U.S. Provisional Patent Application Ser. No. 62/093,810 having a filing date of Dec. 18, 2014, which is incorporated herein in its entirety.

FEDERAL RESEARCH STATEMENT

This invention was made with Government support under Contract No. DE-AC09-085R22470, awarded by the U.S. Department of Energy. The Government has certain rights in the invention.

FIELD OF THE INVENTION

The present invention generally involves a system and method for detecting high-energy photons (i.e., x-rays or gamma rays) produced by a radioisotope or a radiation generating device (RGD). In particular embodiments, the system and method may use existing surveillance cameras to detect, locate, and/or quantify high-energy photons produced by a radioisotope or RGD.

BACKGROUND OF THE INVENTION

Cameras are increasingly used to remotely monitor and inspect areas by capturing still and moving images of the areas. For example, cameras are ubiquitous at airports, hospitals, government offices, commercial stores, roadways, and parking lots to monitor and record events in the areas. Cameras are also often employed to initially inspect areas of unknown hazards to reduce personnel exposure to unknown hazardous conditions.

When high-energy photons are present in the vicinity of the camera, the high-energy photons (i.e., x-rays, or gamma rays) may directly interact with a sensor in the camera to produce a visible speckle effect (e.g., white spots) in the video images. These white spots or "specks" are caused by the high-energy photons interacting with the sensor to create a large number of electron-hole pairs in a localized region nominally the size of a single pixel. This may result in that pixel becoming saturated, i.e., reaching the maximum intensity or maximum charge collection capacity, thus creating the visible speckle effect in the video image. The number of affected pixels is generally proportional to the flux rate (photons per unit area per unit time) of high energy photons at the camera location.

The speckle effect in the video image caused by high-energy photons has been observed for years and is generally considered undesirable noise in the recorded video image. Algorithms have been written by the present inventors as well as others to remove and discard the unwanted "specks" from images to improve image quality. These same algorithms form the basis for software to detect and count the specks for radiation detection and measurement purposes. For example, U.S. Pat. No. 7,391,028 and its progeny describe an apparatus and method for detecting radiation that utilizes pixelated image detectors, such as those included in conventional video cameras, camera phones, webcams, netcams, security cameras, traffic cameras, or any combination of these. The actual test results described therein all use a camera that has been covered with a thick black cloth, black tape, or other means to block the visible light, thereby reducing or preventing the visible light from interacting with the sensor in the camera. The resulting speckle effect of the covered camera is attributed to high-energy photons from a test source and analyzed to determine the presence and/or flux rate from the radioisotope or RGD at the camera location.

Other applications of varying sensitivity have been developed to utilize existing cameras to detect and/or quantify high-energy photons based on the speckle effect. However, each application consistently requires some filter or cover over the camera lens to reduce or prevent the visible light from interacting with the sensor. In doing so, the existing systems and methods effectively prevent the camera from performing its original purpose—i.e., to capture still or video images.

Therefore, a system and method that can utilize existing cameras to detect and/or quantify high-energy photons while simultaneously allowing the camera to capture still or video images would be useful. For example, government organizations, law enforcement agencies, and security personnel may use existing video cameras already installed in various locations to detect and/or quantify radioisotope levels in the areas while still obtaining still or video images from the camera.

BRIEF DESCRIPTION OF THE INVENTION

Aspects and advantages of the invention are set forth below in the following description, or may be obvious from the description, or may be learned through practice of the invention.

One embodiment of the present invention is a system for detecting high-energy photons. The system includes a pixelated image detector exposed to visible light and to high-energy photons. The pixelated image detector generates one or more images from the exposure of the pixelated image detector to the visible light. The system further includes one or more processors operably connected to the pixelated image detector and configured to perform operations on the one or more images. The operations include discriminating between the visible light that interacts with the pixelated image detector and the high-energy photons that interact with the pixelated image detector.

In an alternate embodiment of the present invention, the system includes a pixelated image detector and a field of view to the pixelated image detector. The field of view exposes the pixelated image detector to visible light and high-energy photons, and the pixelated image detector generates consecutive images from the field of view. The system further includes one or more processors configured to perform operations on the consecutive images. The operations include comparing the consecutive images to discriminate between the visible light that interacts with the pixelated image detector and the high-energy photons that interact with the pixelated image detector.

A still further embodiment of the present invention is a method for detecting high-energy photons. The method includes exposing a pixelated image detector to visible light and high-energy photons. The method further includes discriminating between the visible light that interacts with the pixelated image detector and the high-energy photons that interact with the pixelated image detector.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components.

Each example is provided by way of explanation of the invention, not limitation of the invention. In fact, it will be apparent to those skilled in the art that modifications and variations can be made to embodiments of the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Various embodiments of the present invention include a system and method for detecting and/or measuring high-energy photons based on the speckle effect produced by a pixelated image detector. In particular embodiments, the system and method may utilize existing still image and video cameras located in varying lighting conditions, with or without motion in the camera's field of view, and without covering the camera's lens. As a result, government organizations, law enforcement agencies, and security personnel may use existing cameras already installed in various locations to also detect and possibly quantify radiation levels in the locations. Alternately, video cameras already being used for visual inspections of locations may also be used to detect and quantify radiation levels in the locations.

Figure 1:
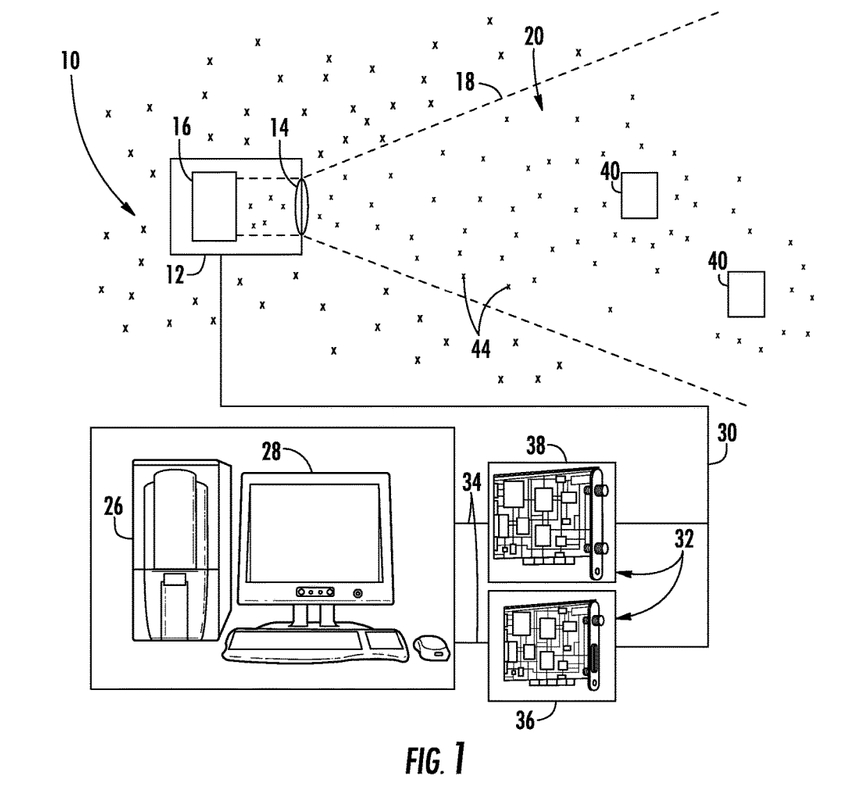
FIG. 1 is a block diagram of a system according to one embodiment of the present invention.

FIG. 1 provides a block diagram of a system 10 according to one embodiment of the present invention. As shown in FIG. 1, the system 10 may include a conventional still or video image camera 12, such as is commonly employed in government organizations, law enforcement agencies, and by security personnel to observe and/or record video images. Suitable cameras within the scope of various embodiments of the present invention include the Watec model 902H2 Supreme monochrome ½" CCD camera, the Watec 221S color camera, or the SVAT CMOS color pinhole camera. The camera 12 may include a lens 14 operably connected to a pixelated image detector 16. The camera 12 may also have connections for analog, wireless, network, or FireWire outputs. A field of view 18 to both the lens 14 and the pixelated image detector 16 exposes both the lens 14 and the pixelated image detector 16 to visible light 20 from at least one direction. The lens 14 and pixelated image detector 16 are generally located inside the camera 12, although in particular embodiments the lens 14 and/or the pixelated image detector 16 may be located outside of the camera 12.

The lens 14 is sized and shaped according to the particular intended use of the camera 12 to focus the visible light 20 onto the pixelated image detector 16. For example, a suitable lens within the scope of embodiments of the present invention may be a 4.5-12.5 mm Computar 06A lens. The visible light 20 focused through the lens 14 interacts with the pixelated image detector 16 to produce desired still or video images 22 as is known in the art.

The pixelated image detector 16 may include any light-sensitive semiconductor material such as is incorporated into a charge-coupled device (CCD) or complementary metal oxide semiconductor (CMOS) device to generate one or more digital still or video images 22 from the exposure to the visible light 20 through the field of view 18. The light-sensitive semiconductor material is sensitive to high-energy photons produced, for example, by a radioisotope or RGD that emits x-rays or gamma rays. Regardless of the source, the high-energy photons may directly interact with the light-sensitive semiconductor material in the pixelated image detector 16 to produce a visible speckle effect 24 (e.g., white spots) in the still or video images 22. A speck is the result of the direct interaction of a high energy photon with the light-sensitive semiconductor material that creates a large number of electron-hole pairs in a localized region nominally the size of a single pixel. The affected pixel may become saturated (i.e., maximum intensity or maximum charge collection capacity), and the number of affected pixels is generally proportional to the number of high-energy photons present.

As shown in FIG. 1, the system 10 further includes one or more processors 26 operably connected to the pixelated image detector 16 and configured to perform operations on the still or video images 22. The processor 26 may be incorporated, for example, in a personal computer 28 or other hardware having an operating system capable of executing software or firmware applications, such as a LabView™ software application. Inasmuch as modern digital cameras often produce an analog signal 30 to take advantage of long-established analog video transmission protocols such as RS-170, NTSC, and PAL, the system 10 may further include one or more analog-to-digital converters 32 to produce a digital signal 34 for use by the processor 26.

As shown in FIG. 1, for example, the system 10 may include a monochrome frame grabber 36, such as an NI-1410 16-bit monochrome frame grabber, for use with a black and white camera. If a 16-bit monochrome frame grabber is used, the digital signal 34 may include a 16-bit unsigned integer having gray levels or intensity levels ranging from 0 to 65,535. Alternately or in addition, the system 10 may include a color frame grabber 38, such as an NI-1405 8-bit monochrome/color frame grabber, for use with either a monochrome or color camera. If a 8-bit monochrome/color frame grabber is used, the digital signal 32 may include an 8-bit unsigned integer having gray levels or intensity levels ranging from 0 to 255. Although 16-bit digitization may generally be preferable to 8-bit digitization, an 8-bit monochrome/color frame grabber may be more desirable for use with color images because color images are conventionally represented by a 32-bit unsigned integer. An 8-bit monochrome/color frame grabber may thus use 8 bits for red, 8 bits for green, and 8 bits for blue, with 8 bits of the 32-bit unsigned integer not used. However, a color image is not necessary to perform the speck analysis described herein. As a result, a monochrome frame grabber may be used to process the analog signal 30 from either a black and white or color camera without affecting the speck analysis.

FIG. 1 illustrates the system 10 exposed to visible light 20 with a radioisotope 40 also present. The radioisotope 40 may be, for example, Cs-137 or Co-60 radioisotopes that produce high-energy photons 44, such as x-rays and gamma rays. As a result, the field of view 18 exposes the lens 14 and the pixelated image detector 16 to visible light 20 and high-energy photons 44.

Figure 2:
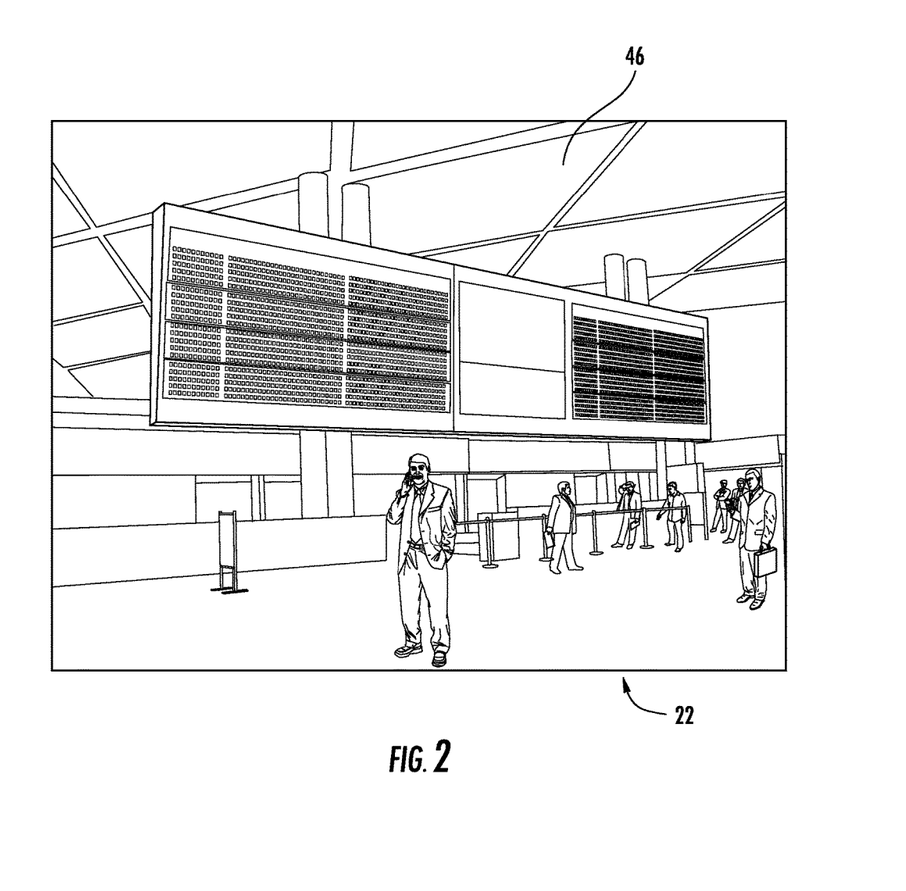
FIG. 2 is an exemplary drawing of a pixelated image produced by a pixelated image detector exposed to visible light only.
Figure 3:
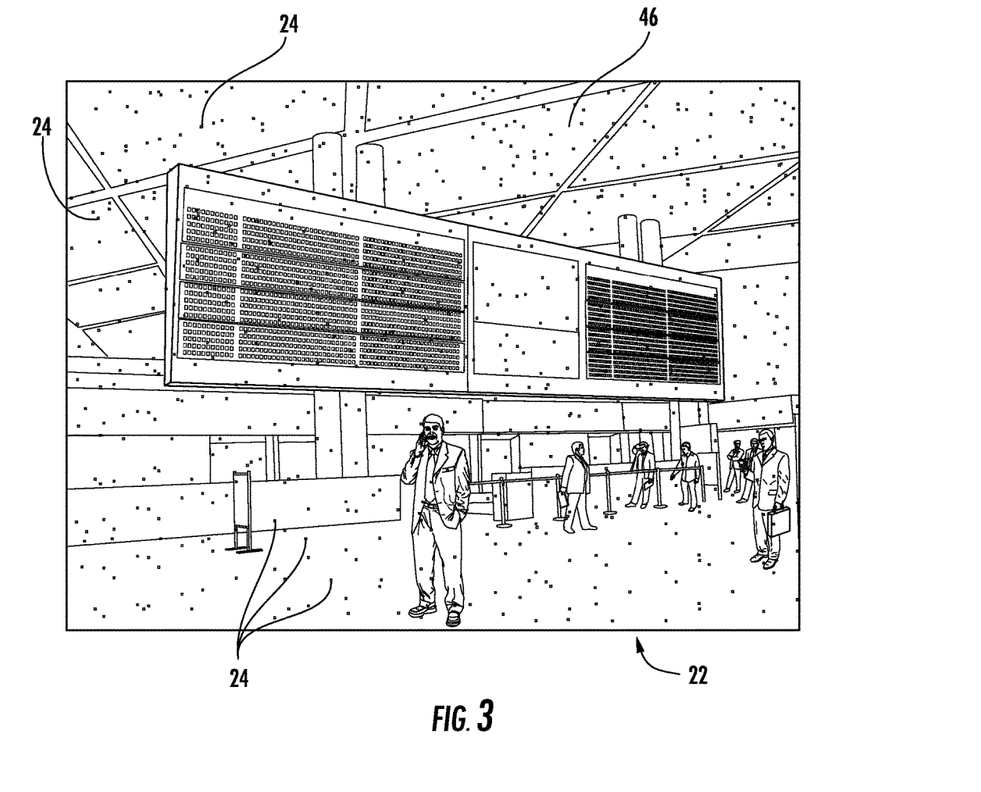
FIG. 3 is an exemplary drawing of a pixelated image produced by a pixelated image detector exposed to visible light with high-energy photons present.
Figure 4:
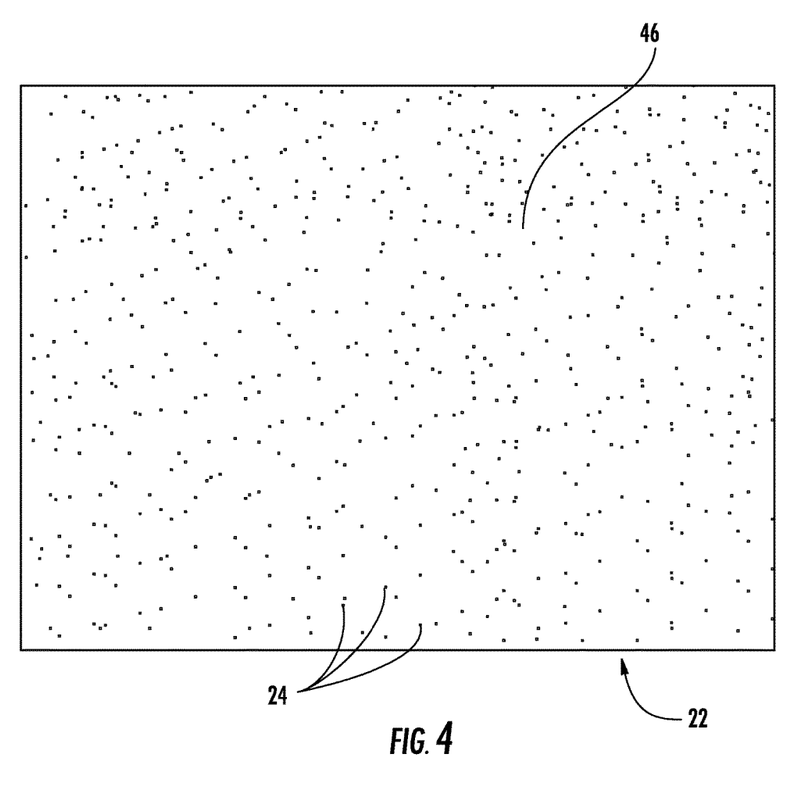
FIG. 4 is an exemplary drawing of the difference between the pixelated images shown in FIGS. 2 and 3.

FIGS. 2-4 provide exemplary drawings of pixelated images 46 produced by the pixelated image detector 16 exposed to visible light 20 and high-energy photons 44 to illustrate the speckle effect 24 caused by the high-energy photons 44. For example, FIG. 2 provides an exemplary drawing of the pixelated image 46 produced by the pixelated image detector 16 exposed to only visible light 20, with no high-energy photons 44 present. As shown in FIG. 2, the visible light 20 directly interacts with the light-sensitive semiconductor material in the pixelated image detector 16 to produce the still or video image 22. In contrast, FIG. 3 provides an exemplary drawing of the pixelated image 46 produced by the pixelated image detector 16 exposed to visible light 20 and high-energy photons 44 produced by the radioisotope 40. As shown in FIG. 3, the visible light 20 and high-energy photons 44 both interact with the light-sensitive semiconductor material in the pixelated image detector 16 to produce the random speckle pattern 24 (i.e., white spots) in the still or video image 22 compared to FIG. 2 due to the interactions between the high-energy photons 44 and the pixelated image detector 16.

FIG. 4 provides an exemplary drawing of the difference between the pixelated images 46 shown in FIGS. 2 and 3. That is, FIG. 4 shows the still or video image 22 shown in FIG. 2 removed or subtracted from the image 22 and uniform speckle effect 24 shown in FIG. 3. The resulting pixelated image 46 shown in FIG. 4 thus represents the speckle effect 24 produced from only the high-energy photons 44 that have interacted with the light-sensitive semiconductor material in the pixelated image detector 16.

Figure 5:
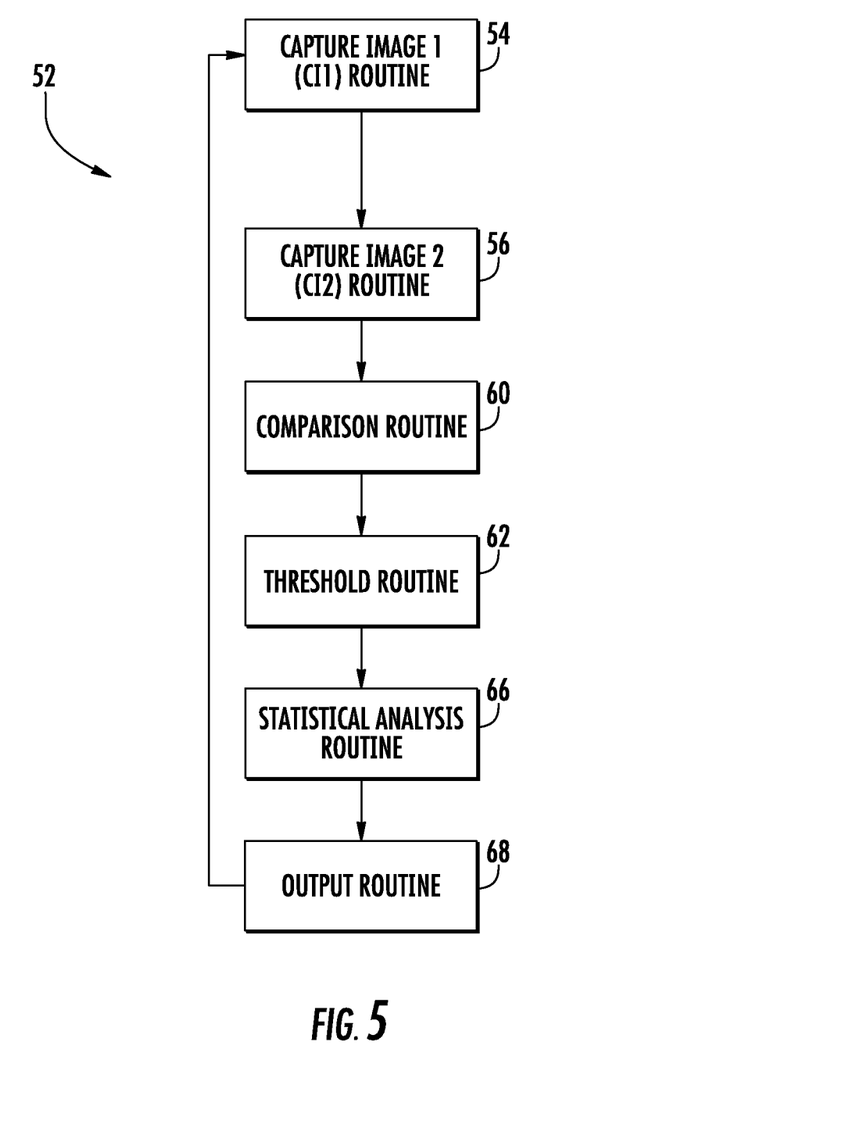
FIG. 5 is a block diagram of an algorithm for software or firmware according to an embodiment of the present invention.

The processor 26 is configured to execute software or firmware that causes the processor 26 to perform one or more operations on the images 22, 46 generated or produced by the pixelated image detector 16. FIG. 5 provides a block diagram of an algorithm 52 for the software or firmware executed by the processor 26 according to an embodiment of the present invention.

As shown in FIG. 5, the algorithm 52 performs a first capture image (CI1) routine 54. In the CI1 routine 54, the field of view 18 exposes the lens 14 and the pixelated image detector 16 to visible light 20 and high-energy photons 44 present at the location. The visible light 20 and high-energy photons 44 interact with the pixelated image detector 16, and the pixelated image detector 16 generates the CI1 pixelated image 46 with the generally random speckle pattern 24, as previously described with respect to FIG. 3. The processor 26 receives the digital signal 34 from the pixelated image detector 16 to capture the still or video image 22 and associated CI1 pixelated image 46 for subsequent use later in the algorithm 52.

The algorithm 52 then performs a second capture image (CI2) routine 56. In the CI2 routine 56, the field of view 18 again exposes the lens 14 and the pixelated image detector 16 to visible light 20 and high-energy photons 44 present at the location. As before, the visible light 20 and high-energy photons 44 both interact with the pixelated image detector 16, and the pixelated image detector 16 generates the pixelated image 46 with the generally random speckle pattern 24, as previously described with respect to FIG. 3. The processor 26 again receives the digital signal 34 from the pixelated image detector 16 to capture the still or video image 22 and associated CI2 pixelated image 46 for subsequent use later in the algorithm 52.

One of ordinary skill in the art will readily appreciate that the CI1 routine 54 and CI2 routine 56 may each be repeated multiple times on images taken closely in time before determining the respective CI1 and CI2 pixelated images 46 to enhance accuracy of the system 10. For example, each routine may actually capture 10, 100, 1000, or another selected number of pixelated images 46 at capture rates ranging from less than 10 frames per second to more than 30 frames per second, depending on various operational needs, such as the desired sensitivity, anticipated environment, and available time. For example, sensitivity of the system 10 may be increased by capturing more pixelated images 46 in each routine, but capturing the additional pixelated images 46 requires a corresponding increase in time to complete. Conversely, each routine may capture fewer pixelated images 46 to produce faster results, with a corresponding decrease in the sensitivity of the system 10. The respective CI1 and CI2 pixelated images 46, and any analysis thereof, may thus be determined by statistically significant sampling of the pixelated images 46 to remove errors associated with random fluctuations, sensitivity, or other inherent variations.

The algorithm 52 performs a comparison routine 60 to analyze the difference between the speckle effect 24 present in the CI1 and CI2 pixelated images 46. For example, the comparison routine 60 may simply compare the CI1 and CI2 pixelated images 46 to remove or subtract everything in the images produced by the visible light 20 interactions with the pixelated image detector 16. The resulting pixelated image 46 includes only the speckle effect 24 produced from the high-energy photons 44 that have interacted with the light-sensitive semiconductor material in the pixelated image detector 16, as previously described with respect to FIG. 4. The comparison routine 60 may then analyze the new pixelated image 46, such as by counting the number of speckles. The number of speckles thus provides a quantitative assessment that reflects the speckle effect 24 produced by the high-energy photon 44 interactions with the pixelated image detector 16.

The algorithm 52 may also include a threshold routine 62 to reduce or eliminate noise from the quantitative assessment produced by the comparison routine 60 and the effects due to electronic noise of the sensor. The threshold routine 62 applies a predetermined threshold limit to the results obtained from the comparison routine 60. The predetermined threshold limit corresponds to a digitized image intensity that may be selected based on several operational variables, such as the light conditions present during the CI1 routine 54, the light conditions present during the CI2 routine 56, or the particular camera 12 being used. Since the threshold routine 62 may eliminate a portion of the speckle effect 24 caused by high-energy photons 44, the threshold routine 62 may further include statistical analysis of the intensity of the speckle effect 24 in the CI1 and/or CI2 pixelated images 46 to recommend or automatically adjust the predetermined threshold limit to minimize the elimination of the speckle effect 24 caused by high-energy photons 44.

Although individual black and white cameras 12 may produce statistically significant different quantitative assessments, the variations between individual black and white cameras may be calibrated by selecting an appropriate predetermined threshold limit for each camera 12 in the threshold routine 62. In contrast, color cameras 12 do not produce statistically significant different quantitative assessments, allowing color cameras to be calibrated with the same predetermined threshold limit in the threshold routine 62. As a result, color cameras 12 may be preferred in situations in which a large number of cameras 12 are included in the system 10 and individual camera 12 calibration would be costly or time consuming. Regardless of the camera used, calibration of individual cameras will enhance accuracy in the quantitative assessments.

The algorithm 52 may then perform a statistical analysis routine 66 on the quantitative assessments from the comparison routine 60 or threshold routine 62, if present. For example, the quantitative assessment provided by the comparison routine 60, as reduced by the threshold routine 62, if present, has been found to have a generally linear correlation to the radiation rate or exposure rate produced by the radioisotope 40. As a result, the statistical analysis routine 66 may convert the quantitative assessment to a radiation level or exposure rate from the radioisotope 40. Alternately or in addition, the statistical analysis routine 66 may identify the minimum, maximum, and/or mean intensity of the speckles attributed to the high-energy photons 44.

The algorithm 52 may then perform an output routine 68 to save the resulting data from the statistical analysis routine 66 with the corresponding CI2 pixelated image 46 in an output file, such as in ASCII file format. The algorithm 52 may then return to the CI1 routine 54 for the desired number of consecutive or successive video images 22 or pixelated images 46 to be analyzed to enhance accuracy of the system 10, as previously discussed.

The algorithm 52 described in FIG. 5 thus allows the processor to perform various operations on the images 22, 46 generated or produced by the pixelated image detector 16. The operations performed by the processor 26 may include discriminating between the visible light 20 that interacts with the pixelated image detector 16 and the high-energy photons 44 that interact with the pixelated image detector 16, as previously described with respect to the comparison routine 60. Alternately or in addition, the operations performed by the processor 26 may include applying the predetermined threshold limit to the output from the comparison routine 60 to remove noise and/or set a minimum detection threshold for the system 10, as previously described with respect to the threshold routine 62. In still further embodiments, the operations performed by the processor 26 may include determining the radiation level or exposure rate from the high-energy photons 44 that interact with the pixelated image detector 16, as previously described with respect to the statistical analysis routine 66.

Although the system 10 may be stationary with no movement in the field of view 18, in some applications, the camera 12 and/or objects in the field of view 18 may be moving. Movement by the camera 12 and/or objects in the field of view 18 increases the speckle effect 24 in the CI1 and CI2 pixelated images 46. If not corrected, the various methodologies previously described in the CI1 and CI2 routines 54, 56, the comparison routine 60, and the threshold routine 62 would produce an erroneously high quantitative assessment if the camera 12 and/or objects in the field of view 18 were moving. Therefore, in particular embodiments of the present invention, the algorithm 52 may further include a residual motion subroutine to reduce the effect that motion by the camera 12 and/or objects in the field of view 18 may have on the quantitative assessment.

The residual motion subroutine may be incorporated into the comparison routine 60, the threshold routine 62, some combination of these routines, or as a stand-alone routine. The residual motion subroutine operates on the principle that the speckle effect 24 produced by high-energy photons 44 is generally random in nature, but the speckle effect 24 caused by movement of the camera 12 or objects in the field of view 18 is organized. Specifically, speckles caused by movement of the camera 12 or objects in the field of view 18 tend to be clustered. Speckles that are connected to one another or within a preselected distance may be attributed to movement of the camera 12 or objects in the field of view 18, as opposed to speckles produced by high-energy photons 44, and filtered or removed from the pixelated image 46. One of ordinary skill in the art will readily recognize that a faster capture rate for the CI1 and CI2 pixelated images 46 will enhance performance of the residual motion subroutine. Alternately or in addition, various spatial domain techniques, such as the size of the area of the consecutive CI1 and CI2 pixelated images 46 being compared, may be adjusted to enhance performance of the residual motion subroutine.

Embodiments of the present invention may also provide a method for detecting high-energy photons. The method may include exposing the pixelated image detector 16 to visible light 20 and high-energy photons 44, as previously described with respect to FIG. 1. The method may also include discriminating between the visible light 20 that interacts with the pixelated image detector 16 and the high-energy photons 44 that interact with the pixelated image detector 16, as previously described with respect to FIG. 5.

In particular embodiments, the method may further include generating consecutive images 22, 46 from the exposure of the pixelated image detector 16 to the ambient light 20 and/or comparing the consecutive images 22, 46 to discriminate between the ambient light 20 that interacts with the pixelated image detector 16 and the high-energy photons 44 that interact with the pixelated image detector 16. Alternately or in addition, the method may include determining the radiation level from the high-energy photons 44 that interact with the pixelated image detector 16.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system for detecting high-energy photons, comprising:
  a pixelated image detector for capturing at least a still image or a video image;
  the pixelated image detector situated such that a visible light and one or more high-energy photons interact with the pixelated image detector, wherein the pixelated image detector generates a desired number of consecutive still images or video images from the visible light and high-energy photons interacting with the pixelated image detector;

a lens between the pixelated image detector and the visible light; and one or more processors operably connected to the pixelated image detector and configured to perform operations on the one or more still or video images, the operations comprising:

comparing the desired number of consecutive still images or video images to discriminate between the visible light that interacts with the pixelated image detector and the high-energy photons that interact with the pixelated image detector;

creating a pixelated image based at least in part on said comparison;

applying a predetermined threshold limit to the high-energy photons that interact with the pixelated image detector; and determining a radiation level from the pixelated image.

2. The system as in claim 1, wherein the operations further comprise determining the radiation level from the high-energy photons that interact with the pixelated image detector.

3. A system for detecting high-energy photons, comprising:

a pixelated image detector for capturing at least a still image or a video image;

a field of view to the pixelated image detector, wherein the pixelated image detector interacts with a visible light and one or more high-energy photons from the field of view, and the pixelated image detector generates a desired number of consecutive still or video images from the field of view;

a lens between the pixelated image detector and the visible light; and one or more processors configured to perform operations on the desired number of consecutive still or video images, the operations comprising;

comparing the desired number of consecutive still or video images to discriminate between the visible light that interacts with the pixelated image detector and the high-energy photons that interact with the pixelated image detector;

creating a pixelated image based at least in part on said comparison;

applying a predetermined threshold limit to the high-energy photons that interact with the pixelated image detector; and determining a radiation level from the pixelated image.

4. The system as in claim 3, wherein the operations further comprise determining the radiation level from the high-energy photons that interact with the pixelated image detector.

5. A method for detecting high-energy photons, comprising:

positioning a pixelated image detector such that a visible light and one or more high-energy photons interact with the pixelated image detector, the pixelated image detector being adapted for capturing a desired number of consecutive still images or video images from the visible light and high-energy photons interacting with the pixelated image detector, wherein a lens is between the pixelated image detector and the visible light;

comparing the desired number of consecutive still images or video images to discriminate between the visible light that interacts with the pixelated image detector and the high-energy photons that interact with the pixelated image detector;

creating a pixelated image based at least in part on said comparison;

applying a predetermined threshold limit to the high-energy photons that interact with the pixelated image detector; and determining a radiation level from the pixelated image.

6. The method as in claim 5, further comprising determining the radiation level from the high-energy photons that interact with the pixelated image detector.

* * * * *